US008113848B2

(12) United States Patent
Gelbart et al.

(10) Patent No.: US 8,113,848 B2
(45) Date of Patent: Feb. 14, 2012

(54) ONLINE SYSTEM AND METHOD FOR MOTIVATING STUDENTS TO IMPROVE THEIR GRADE POINT AVERAGE

(76) Inventors: Jeremy Gelbart, Far Rockaway, NY (US); Steve Wolf, Far Rockaway, NY (US)

( * ) Notice: Subject to any disclaimer, the term of this patent is extended or adjusted under 35 U.S.C. 154(b) by 991 days.

(21) Appl. No.: 12/000,235

(22) Filed: Dec. 11, 2007

(65) Prior Publication Data

US 2009/0148826 A1 Jun. 11, 2009

(51) Int. Cl.
*G09B 3/00* (2006.01)
(52) U.S. Cl. .......................................... 434/322; 434/350
(58) Field of Classification Search .......... 434/322–365, 434/238, 440; 273/138.1, 236, 274; 463/13, 463/16, 18; 700/91–93
See application file for complete search history.

(56) References Cited

U.S. PATENT DOCUMENTS

| 4,909,740 | A | 3/1990 | Rankin | |
|---|---|---|---|---|
| 5,951,297 | A | 9/1999 | Schwartz | |
| 2003/0134261 | A1 | 7/2003 | Jennen et al. | 434/354 |
| 2004/0009462 | A1 | 1/2004 | McElwrath | 434/350 |
| 2004/0197753 | A1 | 10/2004 | Kirsch | |
| 2005/0130112 | A1 | 6/2005 | Lotvin et al. | 434/323 |
| 2005/0187000 | A1* | 8/2005 | Miller | 463/6 |
| 2005/0227216 | A1 | 10/2005 | Gupta | |
| 2006/0127870 | A1 | 6/2006 | Fields et al. | 434/350 |
| 2007/0186007 | A1 | 8/2007 | Field et al. | |

OTHER PUBLICATIONS

Students Perceptions of the Incorporation of Games into Classroom Instruction for basic and Clinical Pharmacokinetics, www.pubmedcentral.nih.gov (Am J. Pharm Educ) (Apr. 15, 2007) p. 1-12.
Letters to the Editor: 'Grade gambling' at BU, The Daily Free Press (Dec. 12, 2005) p. 1 of 1.
StickK.com—Put a contract out on yourself!

* cited by examiner

*Primary Examiner* — Xuan Thai
*Assistant Examiner* — Timothy A Musselman
(74) *Attorney, Agent, or Firm* — Morgan, Lewis & Bockius LLP

(57) ABSTRACT

A method for motivating students to improve their grade point average using a network system, comprising the steps of inputting into the network system a student's current class schedule; generating wagering odds for the student to achieve first grades for current class schedule; communicating possible wagering odds between the network system and the student resulting in finalized wagering odds; accepting the finalized wagering odds; achieving, by the student, second grades for the current class schedule at the end of a current term; and if the second grades are at least equal to the first grades, rewarding the student in accordance with the accepted wagering odds.

22 Claims, 5 Drawing Sheets

| Application Layer / Layer 5
202 |
|---|
| Transport Layer / Layer 4
204 |
| Internet Layer / Layer 3
206 |
| Network Interface Layer / Layer 2
208 |
| Physical Layer / Layer 1
210 |

TCP/IP Layering Model

Fig. 2

ONLINE SYSTEM AND METHOD FOR MOTIVATING STUDENTS TO IMPROVE THEIR GRADE POINT AVERAGE

FIELD OF THE INVENTION

The present invention relates to an online system and method for motivating students to improve their grade point average that allows a student to wager that grades received will be at least as good, if not better than grades predicted.

BACKGROUND OF THE INVENTION

Success in the academic arena is based, primarily, upon the grades a student achieves during his or her scholastic career. And, of course, a successful academic career results in a promise for a successful future profession (both monetarily and emotionally). Thus, the desire to achieve the highest possible grades is a common sentiment for all students. However, students do not try their hardest throughout their school careers. Often the desire to achieve good grades may wane as a student's class schedule gets difficult and/or as the student gets busy with other outside interests. Thus, the delayed benefits of achieving good grades are sometimes insufficient motivators. It is a constant challenge to devise ways to motivate students throughout their academic careers to achieve the highest possible grades that they can.

Juxtaposed with the desire to achieve good grades is the very natural human desire to successfully gamble, or wager something of material value on an event with an uncertain outcome with the primary intent of winning additional money and/or material goods. Though many participate in gambling as a form of recreation or even as a means to gain an income, gambling can become a psychologically addictive and harmful behavior in some people, and some gamblers persist in gambling even after repeated losses. What is needed is a system that transforms a popular yet potentially addictive and harmful activity into an activity that will improve a person's life and emotions.

SUMMARY OF THE INVENTION

Accordingly, the present invention is directed to a method and system that substantially obviates one or more of the problems due to limitations and disadvantages of the related art. The present invention provides a method for motivating students to improve their grade point average using a network system while allowing them to enjoy the pleasures of successfully placing wagers on the network system.

It is an object of the invention to provide a method that will motivate students throughout their academic careers to achieve the highest possible grades that they can.

It is another object of the invention to provide a method of allowing a student to wager that grades received will be at least as good as an objective prediction of what grades the student could achieve, thus motivating a student to generally improve.

Another object of the invention is to ensure that whatever wagers are made will insure that the wagerer may still profit from the experience, whether or not the wager results in monetary gain since throughout the wagering period the student will be improving academically.

Additional features and advantages of the invention will be set forth in the description that follows, and in part will be apparent from the description, or may be learned by practice of the invention. The objectives and advantages of the invention will be realized and attained by the method that is particularly pointed out in the written description and claims hereof as well as the appended drawings.

To achieve these and other advantages and in accordance with the purpose of the invention, as embodied and broadly described, the present invention provides a method for motivating students to improve their grade point average using a network system, comprising the steps of inputting into the network system a student's current class schedule; generating wagering odds for the student to achieve first grades for current class schedule; communicating possible wagering odds between the network system and the student resulting in finalized wagering odds; accepting the finalized wagering odds; achieving, by the student, second grades for the current class schedule at the end of a current term; and if the second grades are at least equal to the first grades, rewarding the student in accordance with the accepted wagering odds.

Another aspect of the invention provides a method for motivating students to improve their grade point average using a network system, comprising the steps of inputting into the network system a plurality of student's current class schedules; generating wagering odds for each of the plurality of students to achieve first grades for current class schedule; communicating possible wagering odds between the network system and the plurality of students resulting in finalized wagering odds for each student; accepting the finalized wagering odds by at least one of the plurality of students; achieving second grades by the at least one of the plurality of students for the current class schedule at the end of a current term; and rewarding the at least one of the plurality of students in accordance with the accepted wagering odds.

A further aspect of the invention is a method for motivating students to improve their grade point average using a network system, comprising the steps of inputting into the network system a plurality of student's current class schedules; generating wagering odds for each of the plurality of students to achieve first grades for current class schedule; communicating possible wagering odds between the plurality of students resulting in finalized wagering odds for each student; accepting the finalized wagering odds by at least one of the plurality of students; verifying second grades achieved by the at least one of the plurality of students for the current class schedule at the end of a current term; and rewarding the at least one of the plurality of students in accordance with the accepted wagering odds.

It is to be understood that both the foregoing general description and the following detailed description are exemplary and explanatory and are understood to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 2 illustrates the TCP/IP Layering Model.

DESCRIPTION OF THE PREFERRED EMBODIMENTS

Reference will now be made in detail to the preferred embodiments of the present invention, examples of which are illustrated in the accompanying drawings. The present invention described below extends the functionality of the inventive system and method for online electronic trading of assets.

Figure 1:
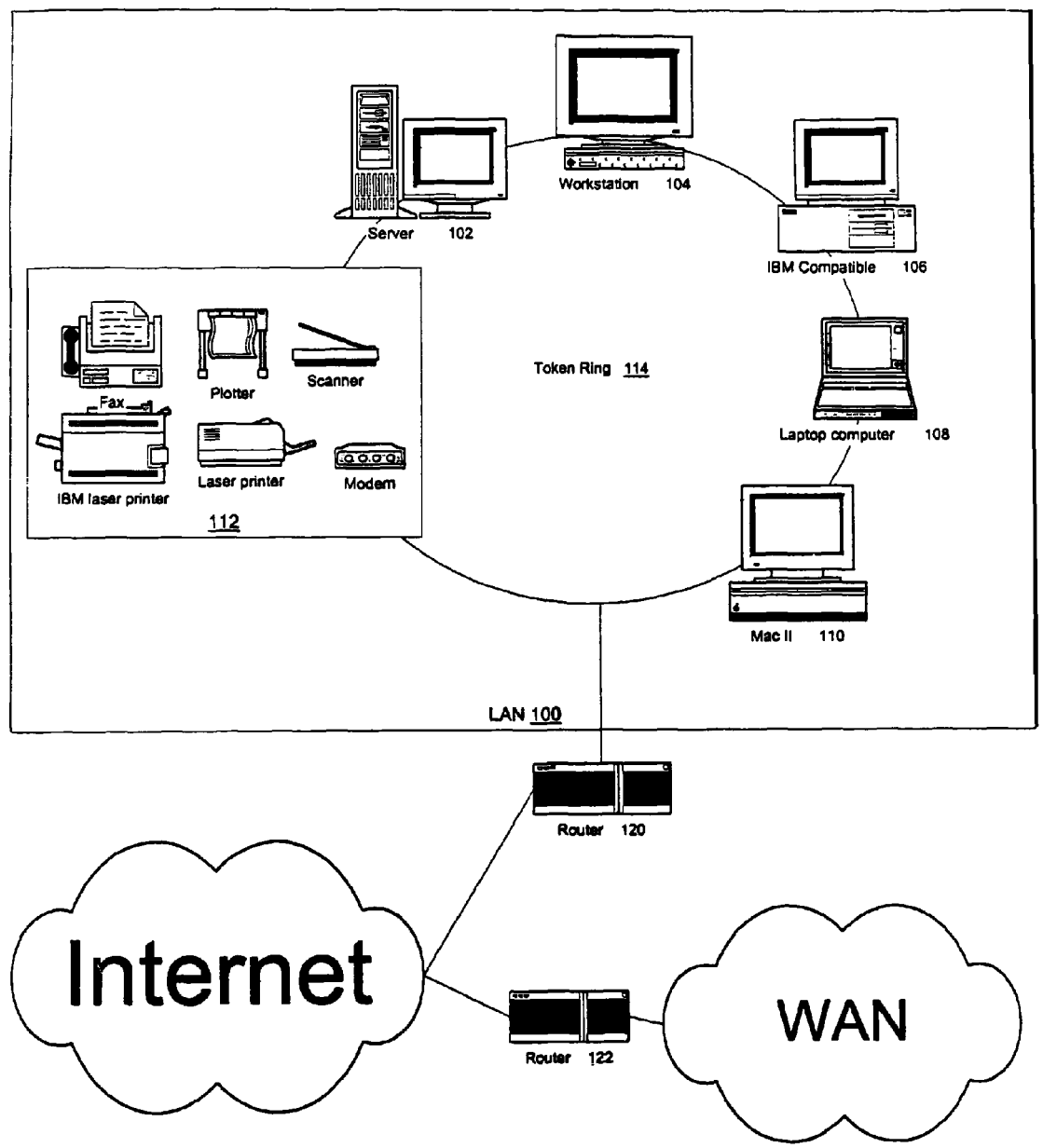
FIG. 1 illustrates an example of a local area network (LAN) 100 that is connected to the Internet and in which the inventive method may be utilized.

FIG. 1 illustrates an example of a local area network (LAN) 100 that is connected to the Internet and in which the inventive system and method may be utilized. LAN 100 comprises a server 102, four computer systems 104, 106, 108, 110, and peripherals, such as printers and other devices 112, that may be shared by components on LAN 100. Computer systems 104, 106, 108, 110 may serve as clients for server 102 and/or as clients and/or servers for each other and/or for other components connected to LAN 100. Components on LAN 100 are preferably connected together by cable media, for example unshielded twisted pair (UTP) Category 5 copper cable, and the network topology may be an Ethernet topology 114. It should be apparent to those of ordinary skill in the art that other media, for example, fiber optic or wireless radio frequency media, may also connect LAN 100 components. It should also be apparent that other network topologies, such as Token Ring, may be used.

Data may be transferred between components on LAN 100 in packets, i.e., blocks of data that are individually transmitted over LAN 100. Routers 120, 122 create an expanded network by connecting LAN 100 to other computer networks, such as the Internet, other LANs or Wide Area Networks (WAN). Routers are hardware devices that may include a conventional processor, memory, and separate I/O interface for each network to which it connects. Hence, components on the expanded network may share information and services with each other. In order for communications to occur between components of physically connected networks, all components on the expanded network and router 304s that connect them must adhere to a standard protocol. Computer networks connected to the Internet and to other networks typically use TCP/IP Layering Model Protocol. It should be noted that other inter-networking protocols may be used.

FIG. 2 illustrates the TCP/IP Layering Model, which is comprised of an application layer (Layer 5) 202, a transport layer (Layer 4) 204, an Internet layer (Layer 3) 206, a network interface layer (Layer 2) 208, and a physical layer (Layer 1) 210. Application layer protocols 202 specify how each software application connected to the network uses the network. Transport layer protocols 204 specify how to ensure reliable transfer among complex protocols. Internet layer protocols 206 specify the format of packets sent across the network as well as mechanisms used to forward packets from a computer through one or more routers to a final destination. Network interface layer protocols 208 specify how to organize data into frames and how a computer transmits frames over the network. Physical layer protocols 210 correspond to the basic network hardware. By using TCP/IP Layering model protocols, any component connected to the network can communicate with any other component connected directly or indirectly to one of the attached networks.

Figure 3:
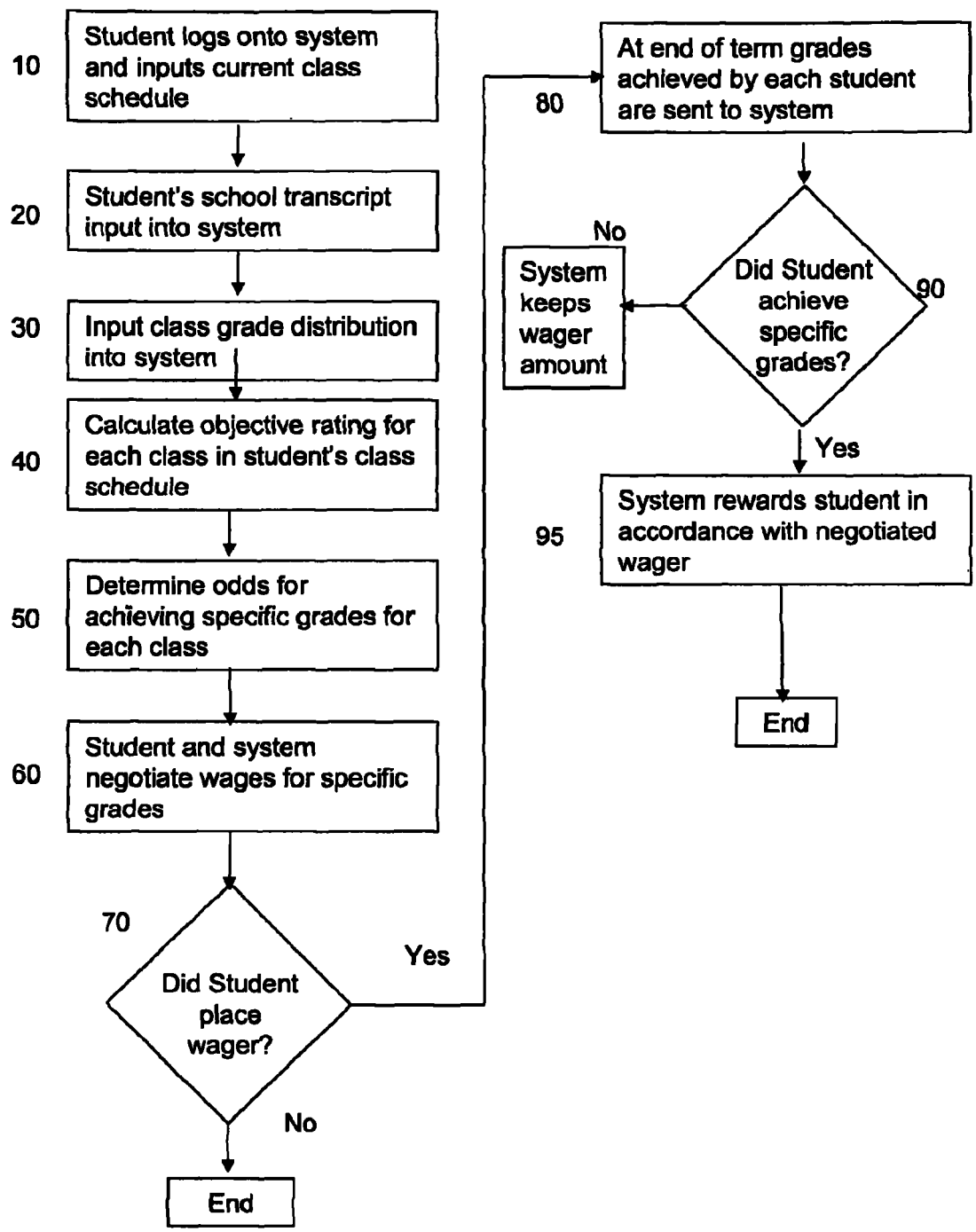
FIG. 3 is a flow chart illustrating the steps of a first embodiment of the present invention.

FIG. 3 is a flow chart illustrating the steps of a first embodiment of the present invention. As shown in FIG. 3, a student logs onto the grade wagering network system, and inputs his/her current class schedule and school at step 10. The student's school transcript also may be input into the network system at step 20. The transcript will indicate the specific past classes and grades achieved in those classes by the student. The transcript may be an official transcript from the student's school, or may be a listing provided by the student, which can be verified later by the network system. Alternatively, the network system may download an official transcript from the school using an authorized pass code. Other methods of obtaining a school transcript will be known to those skilled in the art and are incorporated herein.

Armed with this information, other data relating to both the classes already attended by the student and the prospective classes may be input into the network system. For example, at step 30 the grade distribution for the classes submitted by the student may be retrieved by the network system or input into the network system. Grade distribution may be defined as a percentage of students who received A's, B's, C's, D's and F's for that class. The grade distribution also may be broken up for statistical purposes into an average and a standard deviation. This data may span a certain number of class offerings, a certain number of years, or may be determined for a particular professor. This information may be obtained from the school or from online course reviews. Other types of data and procedures for obtaining the data will be known to those skilled in the art and are part of this disclosure. Based upon this data, the network system may calculate an objective rating for each class (both completed classes and prospective classes) at step 40.

Using the objective ratings for each class calculated above, the network system then determines odds for the student to achieve certain grades for the student's current class schedule at step 50. For example, if the student's class schedule includes Calculus, Chemistry, English, and American History, the network system may predict with a certain confidence level that the student will achieve a B in Calculus, an A in Chemistry, a B in English, and a C in American History. This prediction may be presented to the student with the objective that the student and the system may enter negotiations for the student to place a wager, at step 60, for each class. The student may change the odds in the wager by placing an alternative prediction of grades. For example, the student may believe that it is possible to achieve an A in Calculus and a B in American History, and may include a different prediction in the wager. Moreover, the student may communicate with the network system to negotiate better odds than predicted. For example, the student may propose a grade for a particular class (the grade being higher than what the network system predicted) and also the payoff odds and then allow the network system to either reject or accept the bet.

The network system calculates the wagering odds using the prediction for each grade, the profit margin the network system requires (i.e., the percentage of the wager that the network system will retain), and the amount of the wager the student is placing on each class. Of course, the "odds" increase if the student predicts a higher grade than what the network system predicts. Thus, the wagering odds may vary with each class in the current class schedule.

The student either accepts or rejects the wagering odds at step 70. If the student rejects the wagering odds, no wager is finalized and the procedure terminates. On the other hand, if the student accepts the wagering odds, the transaction may be finalized by input of consideration by the student. Depending on the local, state, and federal laws and rules, a student may input credit card information, a credit check and subsequent validation may occur, a third party payment plan may be implemented, etc. Other payment plans and schedules will be known to those skilled in the art and are incorporated into this specification.

At the end of the term, the student's official transcript is sent to the network system in step 80. The official transcript may be sent by the student or by the college on behalf of the student, or the network system may have access to the school's database using an authorized pass code. Other techniques will be known to those skilled in the art and are incorporated into this specification. At step 90, the grades achieved are compared to the predicted and wagered grades. For each class, if the student achieves at least what was predicted, at step 95 the student is rewarded according to the wagering odds that were accepted at the beginning of the term. In an alternative embodiment, if the student's grades are better than predicted and wagered, the reward increases. The reward is calculated for each class; thus, the student may "win" for some classes and "lose" others.

The reward may be a credit sent to the student's credit card (if that was how the wager was placed), may be sent as a check, or may be made through a third party payment plan. Other reward payment plans and schedules will be known to those skilled in the art and are incorporated into this specification. An alternative option is to use the student's reward as payment for a wager relating to the next semester.

Figure 4:
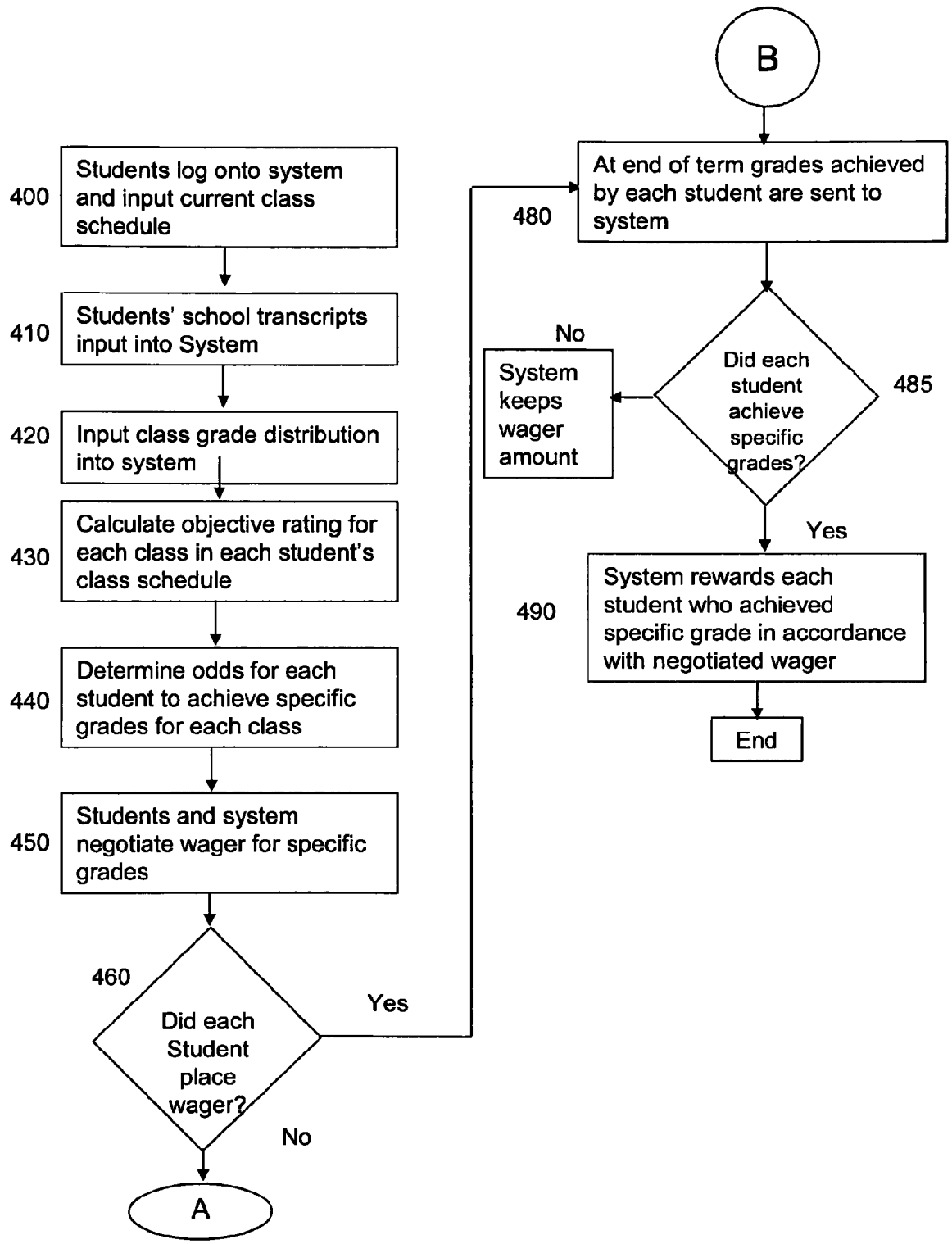
FIG. 4 is a flow chart illustrating the steps of a second embodiment of the present invention.

A second embodiment of the present invention is shown in FIG. 4. In this embodiment, students may compete with each other and the network system. As shown in FIG. 4, and similar to FIG. 3, each student logs onto the grade wagering network system and inputs his/her current class schedule at step 400. Each of the student's transcripts also may be input into the network system at step 410, which will indicate the specific past classes and grades achieved in those classes by each student. As discussed previously, other data relating to those classes may be input into the network system at step 420, such as retrieving a grade distribution for the classes submitted by each student. Grade distribution will be as defined above. Based upon this data, the network system may calculate an objective rating for each class for each student at step 430.

Using the objective ratings for each class calculated above, the network system then determines odds for each student at step 440, which may include a handicap. For example, the network system may predict that one student must achieve one letter grade above another betting student in order to win, or the network system may increase the payoff for one student over the others should that student achieve the grades designated. As discussed earlier, the students may negotiate their wagers by placing alternative predictions of their respective grades, or the grades of each other, or the odds, etc., at step 450.

Figure 5:
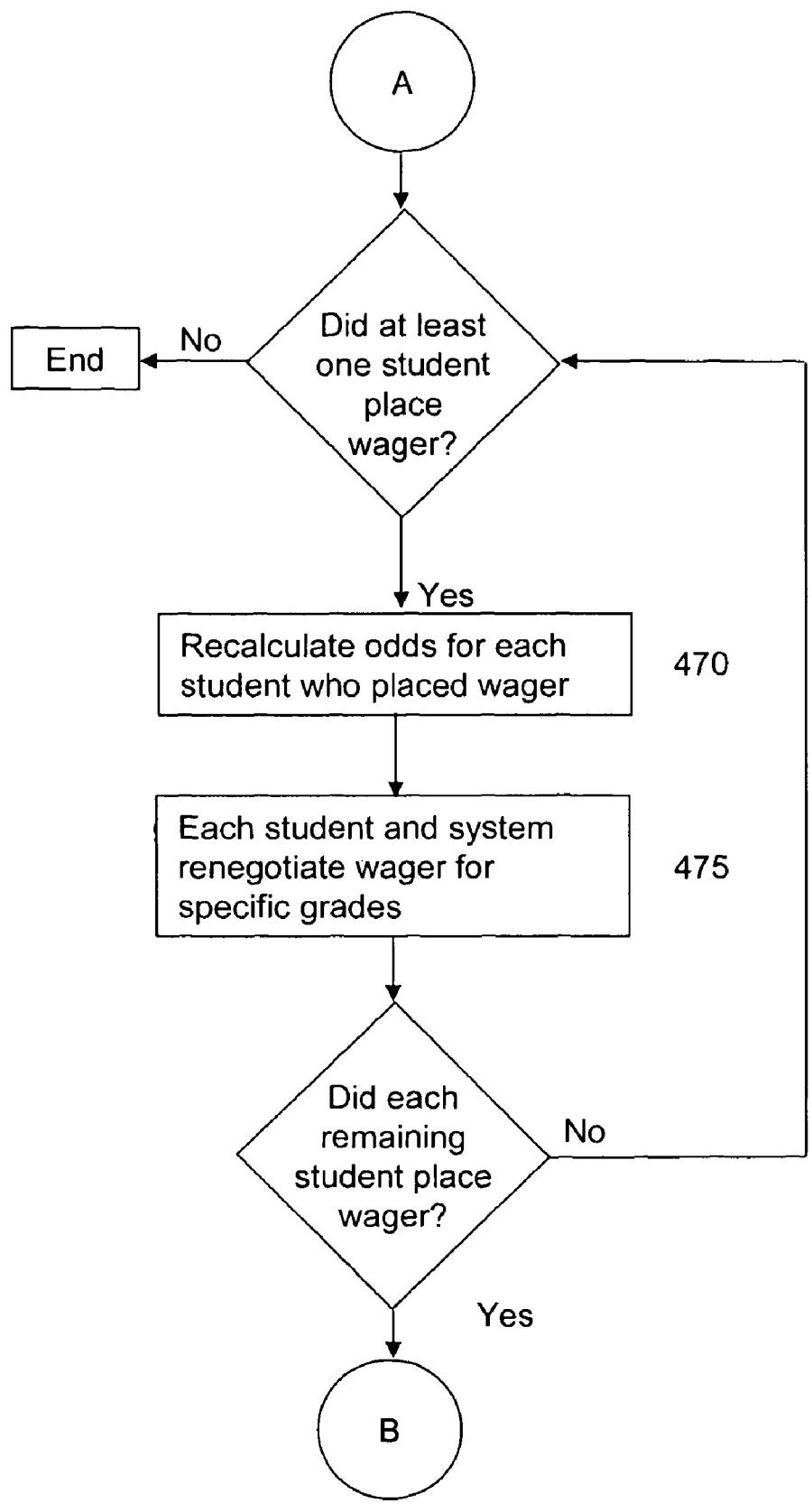
FIG. 5 is a flow chart illustrating the steps necessary for recalculating odds of a wager according to an embodiment of the present invention.

The students either accept or reject the wagering odds at step 460. As shown in FIG. 5, if some of the students reject the wagering odds, the network system may recalculate odds for the remaining students for re-wagering (step 470) and/or further negotiation between students and the network system (step 475). Alternatively, the wagering odds may remain the same.

Once the wagers are in and the wagering odds are accepted, the transaction is finalized as described above, and the final grades are awaited. As shown in FIG. 4, once the final grades are awarded, the betting students' grades are sent to the network system in step 480, the network system compares the grades to the predicted and wagered grades at step 485, and the winners are awarded the appropriate amounts at step 490.

As an alternative, the network system may be used by students as a forum in which to place bets against each other without network system intervention, except for the collection and distribution of bets. In this embodiment, the students log onto the network system and negotiate only with each other. The students determine the odds and wagers using the network system as an objective third party money manager. The network system may retain a percentage of the wagers. Also, the students may request that the network system assist in calculating the payoff amounts once wagering odds are decided.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for motivating students to improve their grade point average using a network system, comprising the steps of:
   inputting into the network system a student's current class schedule;
   generating wagering odds for the student to achieve first grades for current class schedule, further comprising:
   inputting into the network system the student's school transcript showing past classes and grades for the respective past classes of the student;
   retrieving, by the network system, first objective rating data of a difficulty of the classes in the school transcript;
   retrieving, by the network system, second objective rating data of the difficulty of the current class schedule;
   inputting, by the student, a wager;
   determining, by the network system, a percentage of the wager to be retained by the network system; and
   determining, by the network system, a probability of grades to be achieved for the current class schedule based upon the first and second objective rating data obtained, the student's wager, and the wager percentage retained;
   communicating possible wagering odds between the network system and the student resulting in finalized wagering odds;
   accepting the finalized wagering odds;
   achieving, by the student, second grades for the current class schedule at the end of a current term; and
   if the second grades are at least equal to the first grades, rewarding the student in accordance with the accepted wagering odds.

2. The method of claim 1, wherein the step of rewarding the student comprises:
   verifying, by the network system, the second grades;
   returning, to the student, a percentage of the wager based upon the wagering odds; and
   retention by the network system of a percentage of the wager based upon the wagering odds.

3. The method of claim 1, wherein the wagering odds vary for each class in the current class schedule.

4. The method of claim 3, wherein the student may input a wager for each individual class in the current class schedule.

5. The method of claim 4, wherein the step of rewarding further comprises rewarding the student for each class in which a wager was input and the wagering odds was accepted, and the student achieved a second grade at least equal to the first grade.

6. The method of claim 1, wherein the step of accepting further comprises inputting, by the student, a prediction of grades that are at least equal to the first grades.

7. The method of claim 1, where first objective data comprises grade distribution for the student's past classes, and second objective data comprises grade distribution for the student's current class schedule.

8. The method of claim 1, wherein the generating wagering odds is performed by the network system.

9. The method of claim 1, wherein generating wagering odds is performed by the student.

10. The method of claim 1, wherein generating wagering odds is negotiated between the network system and the student.

11. The method of claim 1, wherein accepting the wagering odds is performed by the student.

12. The method of claim 1, wherein accepting the wagering odds is performed by the network system.

13. The method of claim 1, wherein the step of communicating includes negotiations of wagering odds between the student and the network system.

14. A method for motivating students to improve their grade point average using a network system, comprising the steps of:
    inputting into the network system a plurality of student's current class schedules;
    generating wagering odds for each of the plurality of students to achieve first grades for current class schedule, further comprising:
        inputting into the network system each of the student's school transcripts showing past classes and grades for the respective past classes of the student;
        retrieving, by the network system, first objective rating data of a difficulty of the classes in the school transcript;
        retrieving, by the network system, second objective rating data of the difficulty of the current class schedule;
        inputting, by the students, a wager;
        determining, by the network system, a percentage of the wager to be retained by the network system; and
        determining, by the network system, a probability of grades to be achieved for the current class schedule for each of the students based upon the first and second objective rating data obtained, the students' wager, and the wager percentage retained;
    communicating possible wagering odds between the plurality of students resulting in finalized wagering odds for each student;
    accepting the finalized wagering odds by at least one of the plurality of students;
    verifying second grades achieved by the at least one of the plurality of students for the current class schedule at the end of a current term; and
    rewarding the at least one of the plurality of students in accordance with the accepted wagering odds.

15. The method of claim 14, wherein the step of communicating includes negotiations of wagering odds between the plurality of students and the network system.

16. The method of claim 14, wherein if less than the entire plurality of students accepts the wagering odds, the network system generates second wagering odds and based upon the students who accepted the wagering odds.

17. The method of claim 14, wherein the step of rewarding further comprises:
    verifying, by the network system, second grades achieved by the at least one of the plurality of students;
    returning, to the at least one of the plurality of students, a percentage of the wager based upon the wagering odds; and
    retention, by the network system of a percentage of the wager based upon the wagering odds.

18. The method of claim 14, wherein the step of generating wagering odds is performed by the plurality of students.

19. The method of claim 14, wherein the step of generating wagering odds is performed by the network system.

20. The method of claim 14, wherein the step of verifying is performed by the at least one of the plurality of students.

21. The method of claim 14, wherein the step of verifying is performed by the network system.

22. The method of claim 14, wherein the network system retains a percentage of all accepted wagering odds.

* * * * *